United States Patent
Jaynes et al.

(10) Patent No.: US 8,599,806 B2
(45) Date of Patent: Dec. 3, 2013

(54) SYSTEMS AND METHODS FOR PROVIDING CONNECTION STATUS AND LOCATION INFORMATION IN A WIRELESS NETWORKING ENVIRONMENT

(75) Inventors: Allison Jaynes, New City, NY (US); Vittorio G. Bucchieri, Wakefield, MA (US); Albert L. Schmidt, Hopkinton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 13/176,480

(22) Filed: Jul. 5, 2011

(65) Prior Publication Data

US 2011/0268089 A1    Nov. 3, 2011

Related U.S. Application Data

(63) Continuation of application No. 11/010,615, filed on Dec. 13, 2004, now Pat. No. 7,978,665.

(51) Int. Cl.
*H04W 4/00* (2009.01)
*H04W 24/00* (2009.01)

(52) U.S. Cl.
USPC .......... 370/338; 455/456.1; 455/41.1

(58) Field of Classification Search
USPC ............ 455/436–444, 456.1–457, 414.1, 455/418–420, 421, 41.1–41.3; 707/705, 707/706; 701/201, 206, 208–213; 705/14.57, 14.58; 715/736, 738, 700
See application file for complete search history.

(56) References Cited

U.S. PATENT DOCUMENTS

| | | | |
|---|---|---|---|
| 6,211,858 B1 | 4/2001 | Moon et al. | |
| 6,269,395 B1 * | 7/2001 | Blatherwick et al. | 709/219 |
| 6,571,245 B2 | 5/2003 | Huang et al. | |
| 6,898,432 B1 * | 5/2005 | Jiang | 455/456.1 |
| 2002/0067353 A1 * | 6/2002 | Kenyon et al. | 345/419 |
| 2002/0098832 A1 | 7/2002 | Fleischer et al. | |
| 2002/0176579 A1 * | 11/2002 | Deshpande et al. | 380/270 |
| 2002/0178218 A1 | 11/2002 | Butlin | |
| 2003/0036848 A1 * | 2/2003 | Sheha et al. | 701/209 |
| 2003/0195950 A1 | 10/2003 | Huang et al. | |
| 2004/0122959 A1 | 6/2004 | Lortz | |
| 2004/0133687 A1 * | 7/2004 | Yamaguchi et al. | 709/228 |
| 2004/0165007 A1 | 8/2004 | Shafron | |
| 2004/0192310 A1 * | 9/2004 | Karaoguz et al. | 455/440 |
| 2004/0203873 A1 * | 10/2004 | H. Gray | 455/456.1 |
| 2005/0066033 A1 * | 3/2005 | Cheston et al. | 709/225 |
| 2005/0101299 A1 * | 5/2005 | Farnsworth | 455/412.1 |
| 2005/0143094 A1 | 6/2005 | Reed et al. | |
| 2005/0172262 A1 | 8/2005 | Lalwani | |
| 2006/0069504 A1 * | 3/2006 | Bradley et al. | 701/211 |
| 2006/0072527 A1 * | 4/2006 | Beck et al. | 370/338 |

OTHER PUBLICATIONS http://web.archive.org/web/20031206102252/http://www.jiwire.com/search-hotspot-locations.htm, Dec. 6, 2003.*

(Continued)

*Primary Examiner* — Lester Kincaid
*Assistant Examiner* — Daniel Lai

(57) ABSTRACT

A system may provide a client device with a persistent wireless network browser toolbar for use in, for example, a network browser. The persistent wireless network browser toolbar is provided with a login status indicator, a logout option, and a wireless network signal strength indicator.

20 Claims, 12 Drawing Sheets

(56) References Cited

OTHER PUBLICATIONS

A Secure Server-Paid Hot Spot Wi-Fi Internet Service Method by LUO, published in IEEE 6th CAS Symp. on Emerging Technologies: Mobile and Wireless Comm. Shanghai, China, May 31-Jun. 2, 2004.
Windows XP Wireless Deployment Technology and Component Overview, Aug. 4, 2004.
PEAP under Cisco Unified Wireless Networks with ACS 4.0 and Windows 2003, Aug. 4, 2008.
http://web.archive.org/web/20031206102252/www.jiwire.com/search-hotspot-locations.htm Dec. 6, 2003.
http://web.archive.org/web/20031206073432/www.jiwire.com/jiwire-hotspot-offline-wap-avantgo-directory.htm, Dec. 6, 2003.
http.//www.jiwire.com/business/news/press-hotspot-locator.htm, Feb. 25, 2004.
http://www.tucows.com/preview/353008, print date May 24, 2007.
http://www.tucows.com/preview/353008/1448169, print date May 24, 2007.

* cited by examiner

SYSTEMS AND METHODS FOR PROVIDING CONNECTION STATUS AND LOCATION INFORMATION IN A WIRELESS NETWORKING ENVIRONMENT

RELATED APPLICATION

This application is a continuation of U.S. patent application Ser. No. 11/010,615, filed Dec. 13, 2004, now U.S. Pat. No. 7,978,665 the disclosure of which is incorporated by reference herein in its entirety.

BACKGROUND

Wireless communication systems are well known in the art. Generally, these systems include various communication stations which transmit and receive wireless communication signals between one another. One type of wireless system, called a wireless local area network (WLAN), can be configured to conduct wireless communications between various wireless devices equipped with WLAN modems or adapters and either discrete base station devices or other similarly equipped wireless devices in an ad hoc, peer-to-peer manner.

Various types of WLAN protocols have been developed based around several communication industry standards, such as WiFi (a commonly used name for the IEEE 802.11x family of networking protocols) and Bluetooth, each of which enable data exchange over a radio link between devices. Currently, WLAN adapters associated with one or more of these protocols are being integrated into various types of computing and communications devices, such as personal digital assistants (PDA's), laptop or notebook computers, mobile telephones, digital television set top boxes, etc.

As indicated above, one popular WLAN environment typically using one or more WLAN access points or base stations is built according to the IEEE 802.11b standard. In one implementation of this technology, publicly accessible wireless service areas or "hot spots" may be geographically defined through placement of associated access points. These types of wireless communication systems are advantageously employed in public areas, such as airports, coffee shops, hotels, etc. More ambitiously, larger geographic areas, such as parks, city blocks, college campuses or entire towns may also be configured as hot spots by providing a suitable number of access points. Access to these public networks usually requires user authentication procedures. Additionally, connection to such networks may result in the incursion of predetermined fees relating to connection duration, data throughput or both.

To cover an area with a wireless network, the area is provided with a sufficient number of access points so that a computing device within the area can maintain a connection within at least one of the access points. As a computing device moves through the area covered by the network, the access point with which it is connected changes. As the signal strength from a first access point weakens, the signal from a second access-point is likely to become relatively stronger than the signal from the first point, in which case the computing device switches to the second access point. Therefore, the number of computing devices with which any one access point is in communication is likely to vary.

According to the 802.11x protocol, an access point polls each of its connected wireless devices and communicates with that computing device for a predetermined period of time, before breaking the communication and polling the next connected computing device. Accordingly, as the number of computing devices connected to any one access-point increases, the percentage of any one time period in which a base station is in communication with the computing device decreases. This decrease in the percentage of time can lead to a reduced network performance. Indeed, the network performance may drop below that required to provide certain functions.

Because hotspot connections may result in a charge being applied to a connected device's user, it is desirable for users to be made aware of connection status and other information associated with potential charges. Accordingly, there exists a need for systems and methods for effectively providing such information to users of wireless networks.

DETAILED DESCRIPTION OF PREFERRED EMBODIMENTS

The following detailed description of preferred example implementations consistent with the principles of the invention refers to the accompanying drawings. The same reference numbers in different drawings may identify the same or similar elements. Also, the following detailed description does not limit the invention.

Implementations consistent with the principles of the invention may provide wireless network users with efficient and effective ways of monitoring wireless network signal strength and additional information. In this manner, decisions regarding network connectivity and relative geographic position may be more easily made.

In one exemplary implementation, a toolbar may be incorporated into the user's internet browser application. The toolbar may be associated with the wireless network or family of wireless networks for which the user desires access. A toolbar interface may include information relating to wireless network signal strength, login status, and other network-related information. By providing wireless network status information in such a manner, users are significantly more likely to maintain awareness of this status.

In accordance with one implementation consistent with the principles of the invention and further described below, a method may include providing a client device with a persistent wireless network browser toolbar. The persistent wireless network browser toolbar may be provided with a login status indicator, a logout option, and a wireless network signal strength indicator.

In another implementation consistent with the principles of the invention and further described below, a system may include an access point for providing access to a wireless network in a predetermined geographical area. A client device may be operatively connected to the access point via the wireless network. The client device may include a persistent wireless network browser toolbar. The persistent wireless network browser toolbar may include a login status indicator, a logout option, a wireless network signal strength indicator, and a hotspot search tool.

The methods and systems described herein may be implemented in systems comprising processors and memory media, with instructions readable by the processor to perform the various methods described herein.

Figure 1:
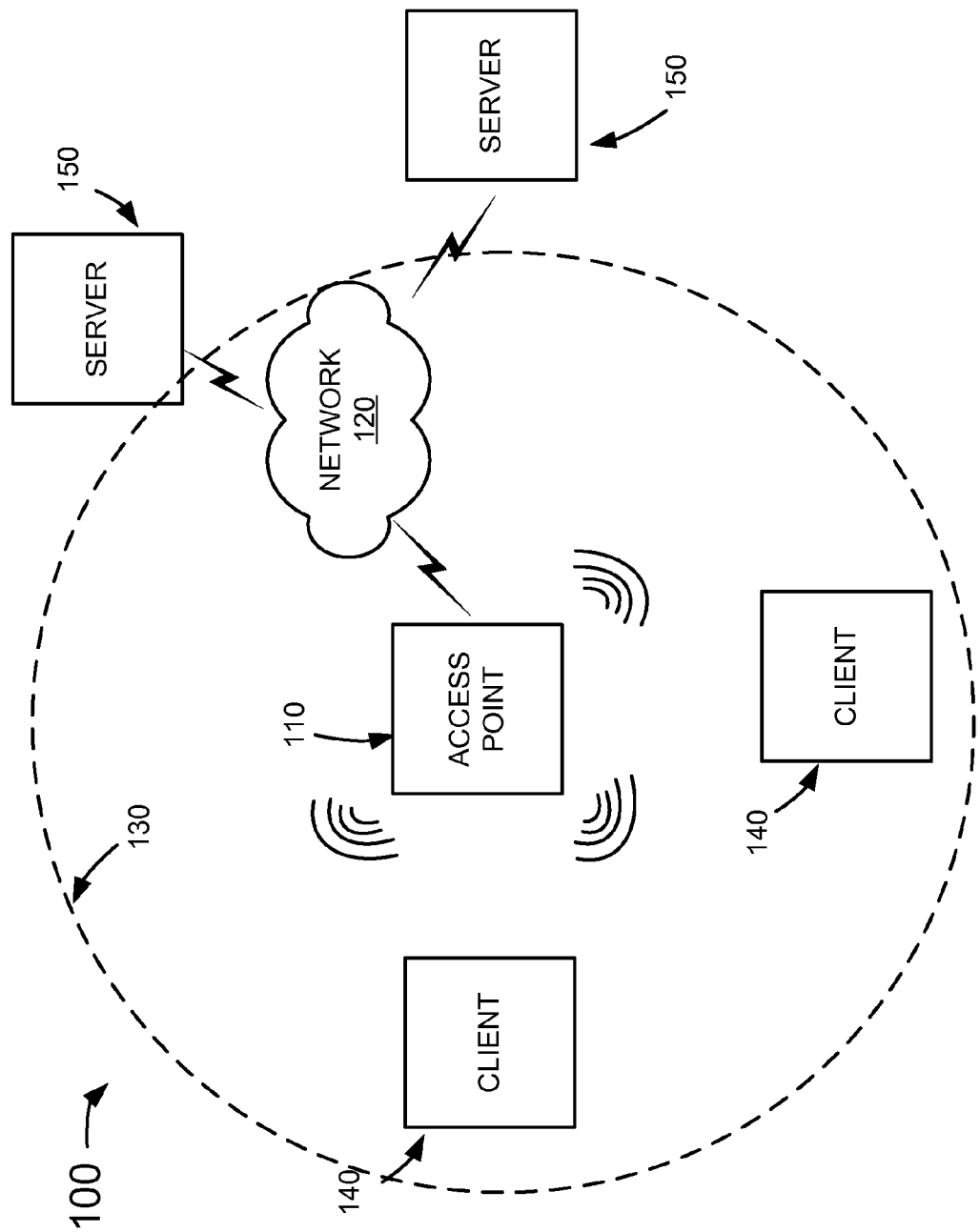
FIG. 1 is an exemplary diagram of a system in which systems and methods consistent with the principles of the invention may be implemented.
Figure 2:
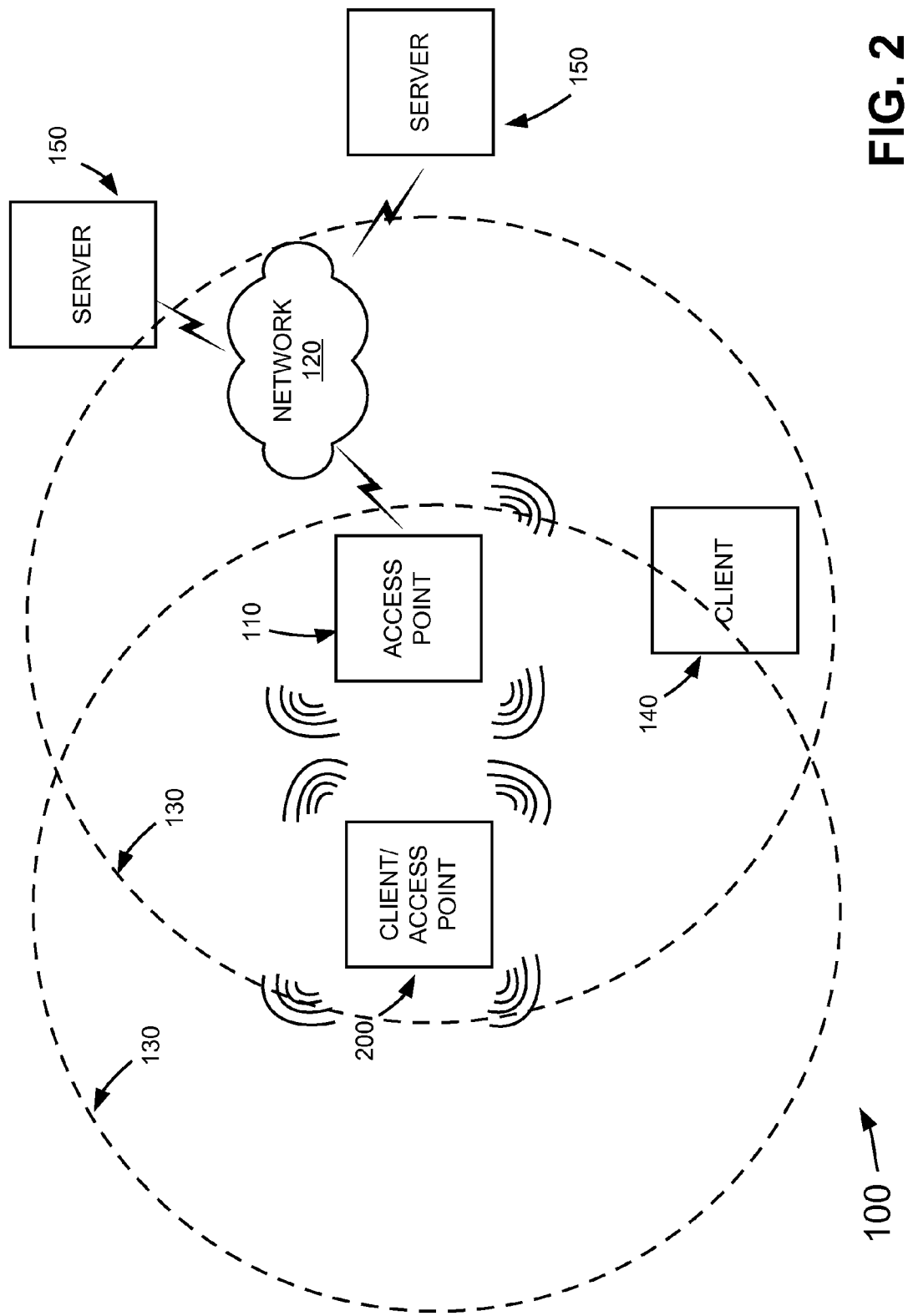
FIG. 2 is a second exemplary diagram of a system in which systems and methods consistent with the principles of the invention may be implemented.

FIGS. 1-4 are exemplary diagrams of systems 100 in which systems and methods consistent with the principles of the invention may be implemented. In FIG. 1, system 100 may include an access point 110 and a client device 140 connected via wireless network 130. A server device 150 maybe connected to access point 110 and client device 140 via a network 120. Two client devices 140, one access point 110, and one server device 150 have been illustrated as connected to network 120 in FIG. 1 for simplicity. In practice, there may be more or fewer client devices 140, access points 110 and server devices 150.

Access point 110 may include any hardware or software, such as an 802.11a, b or g router, a wireless access point, a wireless adapter, a base station, communications protocols, security protocols, etc., that acts as a communication hub for connecting client device 140 to network 120. Client device 140 may include a personal computer, a personal digital assistant (PDA), a laptop or notebook computer, a wireless telephone, or another type of computation or communication device, a thread or process running on one of these devices, and/or an object executable by one of these devices. Additionally, client device 140 may be configured to include a wireless adapter or modem for facilitating connection to access point 110. Network 120 may include a virtual private network (VPN), a local area network (LAN), a wide area network (WAN), a telephone network, such as the Public Switched Telephone Network (PSTN), an intranet, the Internet, an asynchronous transfer mode (ATM) network, or a combination of networks. Access point 110 may connect to network 120 via wired (e.g., electrical or optical) and/or wireless connections. If desired, these connections may be encrypted for privacy, authentication, tamper-protection, etc.

In a manner dependent upon the wireless network protocol used, access point 110 defines a wireless network 130 within a specific geographic area—referred to as a "hotspot"—that is provided with access to network 120. Client devices 140 within the region encompassed by hotspot 130 connect to one of the access points 110 via the established wireless network 130. In a well known manner, wireless networks established using the 802.1 1x family of networking protocols are identified by a service set identifier (SSID). Selection of a network's SSID from a selection of available SSID's enables client devices 140 to connect to wireless network 130 via suitable authentication and account login procedures. Once connected to wireless network 130, a server device 150 may provide content to client device 140 over network 120 and wireless network 130. In one embodiment, server device 150 is associated with the service provider establishing wireless network 130 and providing network access to access point(s) 110.

Figure 3:
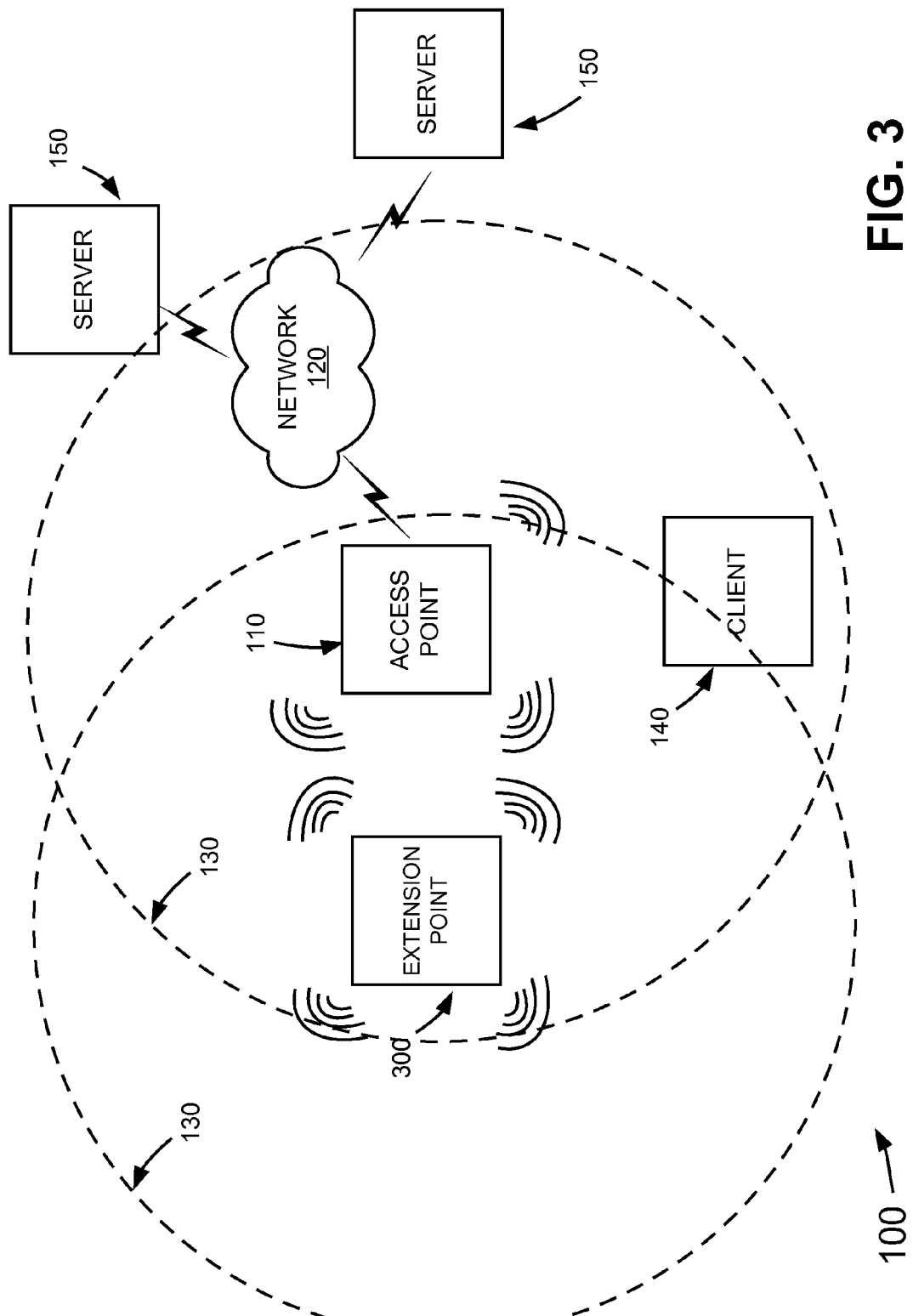
FIG. 3 is a third exemplary diagram of a system in which systems and methods consistent with the principles of the invention may be implemented.

In some instances, a client device 140 may perform the functions of an access point 110. This functionality is shown in detail in FIG. 2, where specific client device 200 operates as an additional access point 110 to extend the range of the wireless network in combination with access point 110. Referring to FIG. 3, a third type of access point, referred to as an extension point, repeater or bridge 300, is provided for extending the range of the wireless network. In this embodiment, access point 300 does not create or manage its own wireless network, but simply acts as a conduit for connecting additional client devices 140 to wireless network 130. As is known in the art, access points established in this manner enable seamless switching by client devices 140 depending upon relative signal strength.

Figure 4:
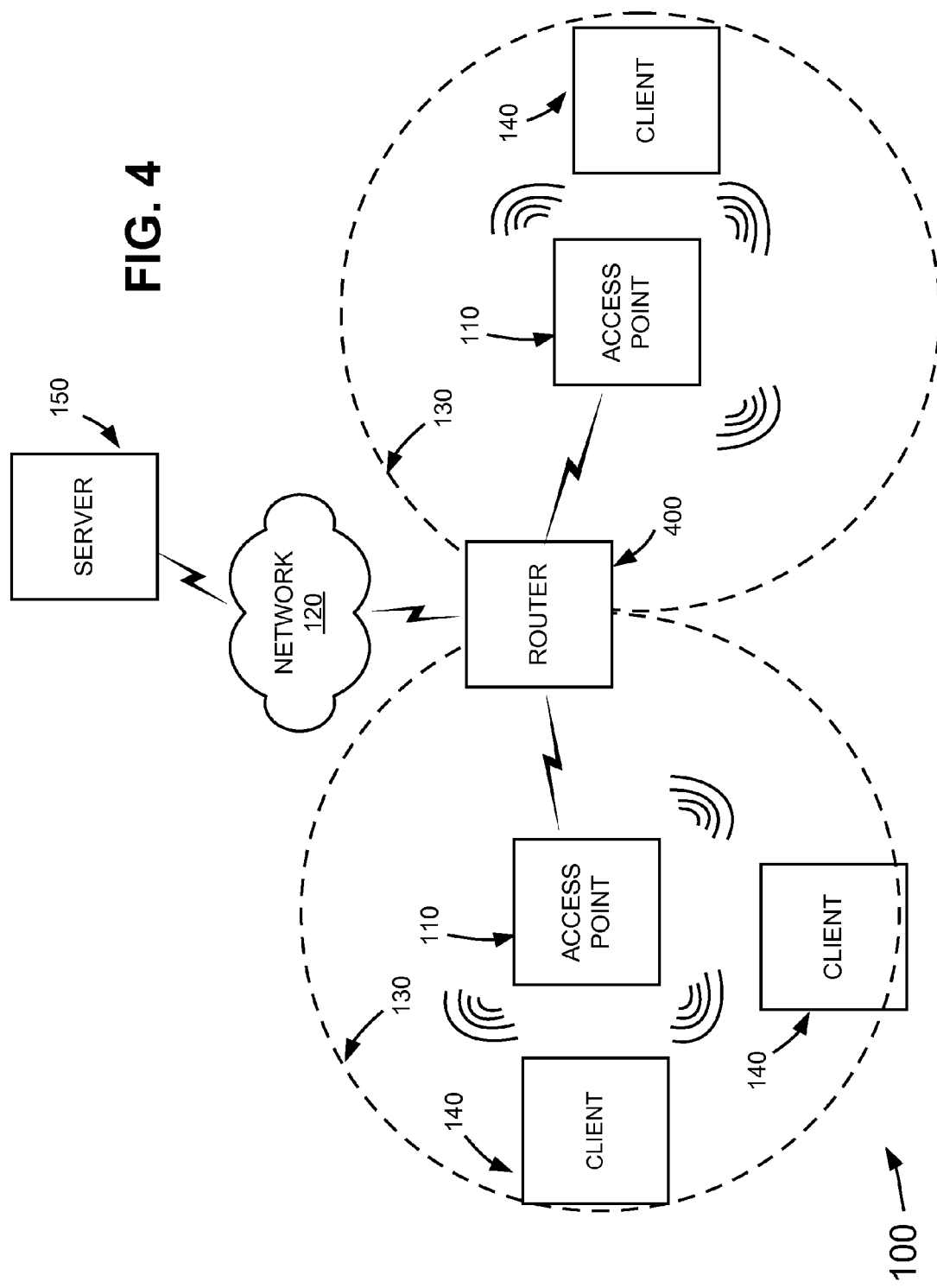
FIG. 4 is a fourth exemplary diagram of a system in which systems and methods consistent with the principles of the invention may be implemented.

FIG. 4 illustrates an additional system environment consistent with the principles of the invention. In the embodiment of FIG. 4, multiple access points 110 are physically connected together via router or hub 400. Router or hub 400 may provide a connection to network 120.

Figure 5:
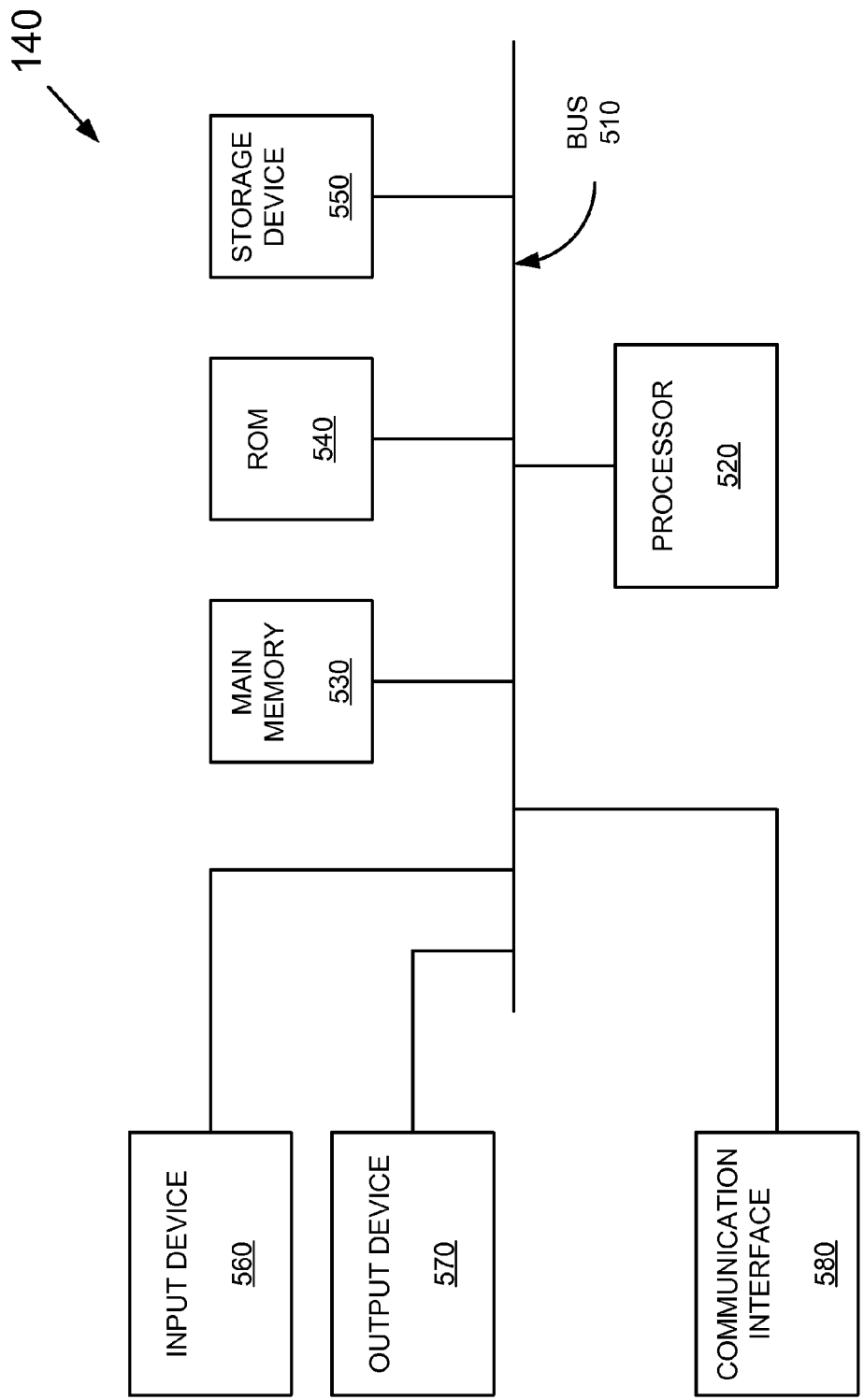
FIG. 5 is an exemplary diagram of a client device of FIGS. 1-4 in an implementation consistent with the principles of the invention.

FIG. 5 is an exemplary diagram of a client device 140 in an implementation consistent with the principles of the invention. Servers 150 and access points 110 may be similarly configured. Client device 140 may include a bus 510, at least one processor 520, a memory system comprising a main memory 530, a read only memory (ROM) 540, and at least one storage device 550, an input device 560, an output device 570, and a communication interface 580. Bus 510 may include a set of conductors that permit communication among the components of client device 140.

Processor 520 may include any type of conventional processor or microprocessor that interprets and executes instructions. Main memory 530 may include a random access memory (RAM) or another type of dynamic storage device that stores information and instructions for execution by processor 520. ROM 540 may include a conventional ROM device or another type of static storage device that stores persistent information and instructions for use by processor 520. Storage device 550 may include a magnetic and/or optical recording medium and its corresponding drive.

Input device 560 may include a conventional mechanism that permits a user to input information to client device 140, such as a keyboard, a mouse, a pen, a biometric mechanism, such as a voice recognition device, etc. Output device 570 may include a conventional mechanism that outputs information to the user, including a display, a printer, a speaker, etc. Communication interface 580 may include any transceiver-like mechanism that enables client device 140 to communicate with other devices and/or systems. For example, communication interface 580 may include mechanisms for communicating with another device or system via a network, such as wireless network 130.

As will be described in detail below, client device 140, consistent with the principles of the invention, may provide wireless network status and related information to users. Client device 140 may perform this and other operations in response to processor 520 executing software instructions contained in a computer-readable medium, such as the memory system. A computer-readable medium may be defined as a memory device and/or carrier wave. For example, the software instructions may be read into main memory 530 from another computer-readable medium, such as data storage device 550, or from another device via communication interface 580. The software instructions contained in main memory 530 may cause processor 520 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 6:
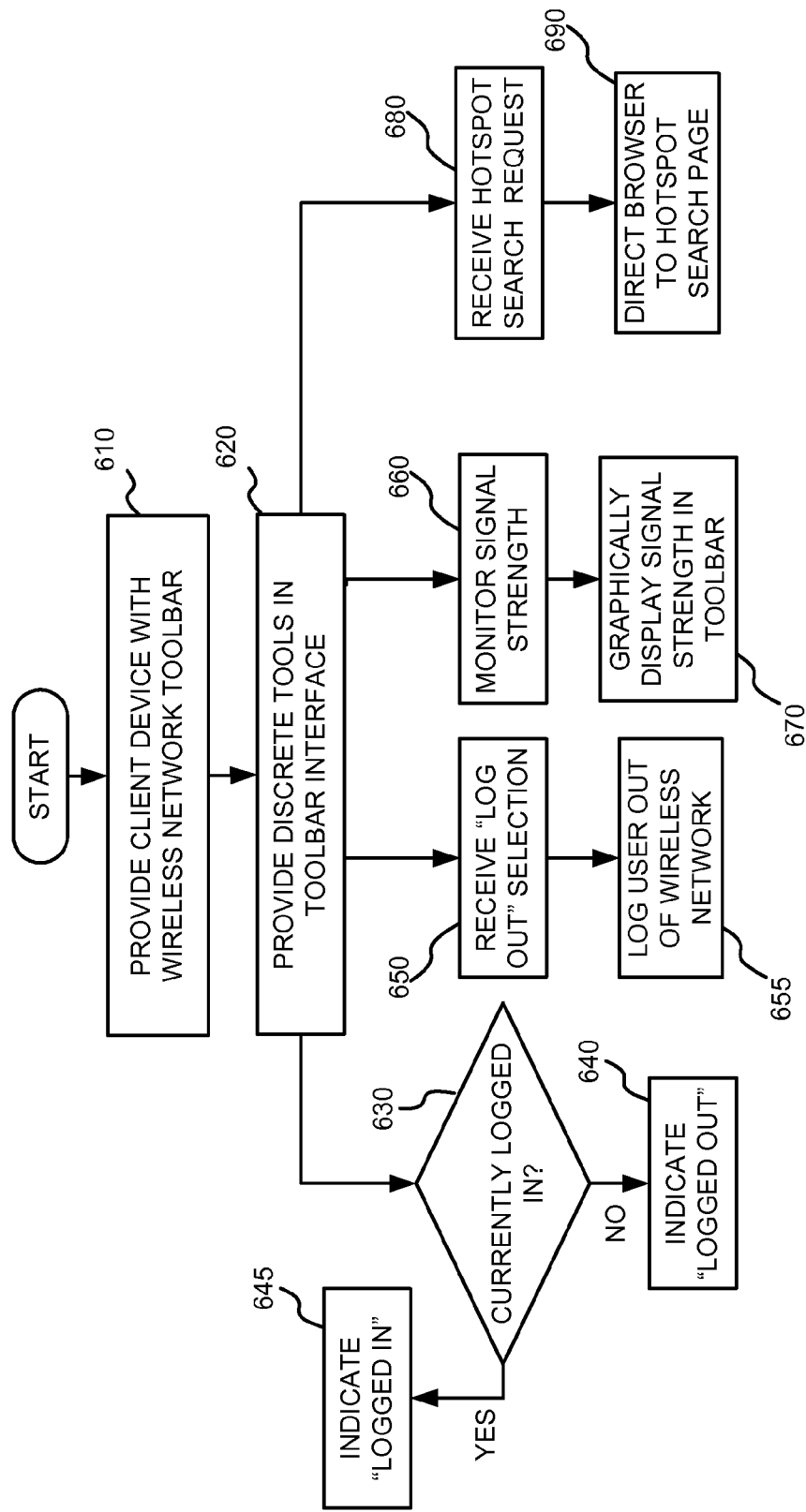
FIG. 6 is a flow chart of an exemplary process for providing wireless network status and hotspot information in an implementation consistent with the principles of the invention.

FIG. 6 is a flow chart of an exemplary process for providing wireless network status and other information to users in an implementation consistent with the principles of the invention. Processing may begin by providing a client device 140 with a persistent wireless network browser toolbar (act 610). In one embodiment, the wireless network browser toolbar is incorporated into a user interface of the client device's network browser. The toolbar is persistent in that it is incorporated into the browser interface rather than network content being viewed, such as a web page or the like. As is known in the art, such a toolbar may be implemented by executing a wireless network toolbar browser plug-in application (hereinafter, the "toolbar application") which runs in combination with the network browser. An exemplary embodiment of such an interface is provided in FIG. 7 and will be discussed in additional detail below.

Once installed, the user is provided with several discrete tools in the toolbar interface, including, but not limited to, a login status indicator, a logout option, a wireless network signal strength indicator, and at least one hotspot location tool (act 620). As described above, these toolbar elements are incorporated into the browser interface and accordingly are present and available to users regardless of network content being viewed. Additionally, such interface incorporation substantially reduces the user's likelihood of losing awareness of network status and hotspot locations.

In order to provide real-time responsiveness to a client device's login status, the toolbar application continually determines, in real-time, whether the client device is logged in to any available wireless network which, for example, may be associated with a certain service provider (act 630). If the toolbar application determines that the user is not logged in to such a wireless network, the login status indicator indicates that the user is logged out (act 640). Conversely, if the toolbar application determines that user is logged in to such a wireless network, the login status indicator that the user is logged in (act 645).

Regarding the logout option provided in act 620, the toolbar application may initially receive a user selection of this option (e.g., by clicking its associated button) (act 650). The toolbar application then logs the user out of any affiliated network to which he or she is currently logged in (act 655).

Relating to the wireless network signal strength indicator, the toolbar application may continually monitor the signal strength of any wireless connection (act 660) and provide a graphical indication of the strength within the toolbar interface (act 670). In one implementation consistent with the principles of the invention, the toolbar application may obtain a continually updated indication of signal strength from a wireless adapter or modem software concurrently running on the client device. Monitoring this information and displaying it to the user in the toolbar interface substantially increases user awareness of the relative strength of their wireless connection, thereby providing them with the ability to modify their environment to enhance user experience.

Regarding the at least one hotspot location tool provided in act 620, in an implementation consistent with the principles of the invention, the at least one location tool receives a user request to search for available hotspots (e.g., by clicking on an associated button) (act 680). In response to such a request, the toolbar application directs the network browser to at least one predefined uniform resource locator (URL), for example, a URL associated with the current service provider and which is related to enabling users to search for associated hotspots using a variety of search criteria (act 690). Exemplary embodiments of web pages illustrating several search methodologies are shown in FIGS. 8-12 and described in detail below.

By providing users with access to a hotspot search tool or web link, users using the persistent wireless network toolbar are more easily able to determine where hotspots are located relative to various known locations. Additionally, users presently logged into a hotspot can easily identify places within the hotspot that they can sit and use the network, such as shops, parks, etc. The persistent nature of the toolbar substantially increases the user's ability to use these tools.

Figure 7:
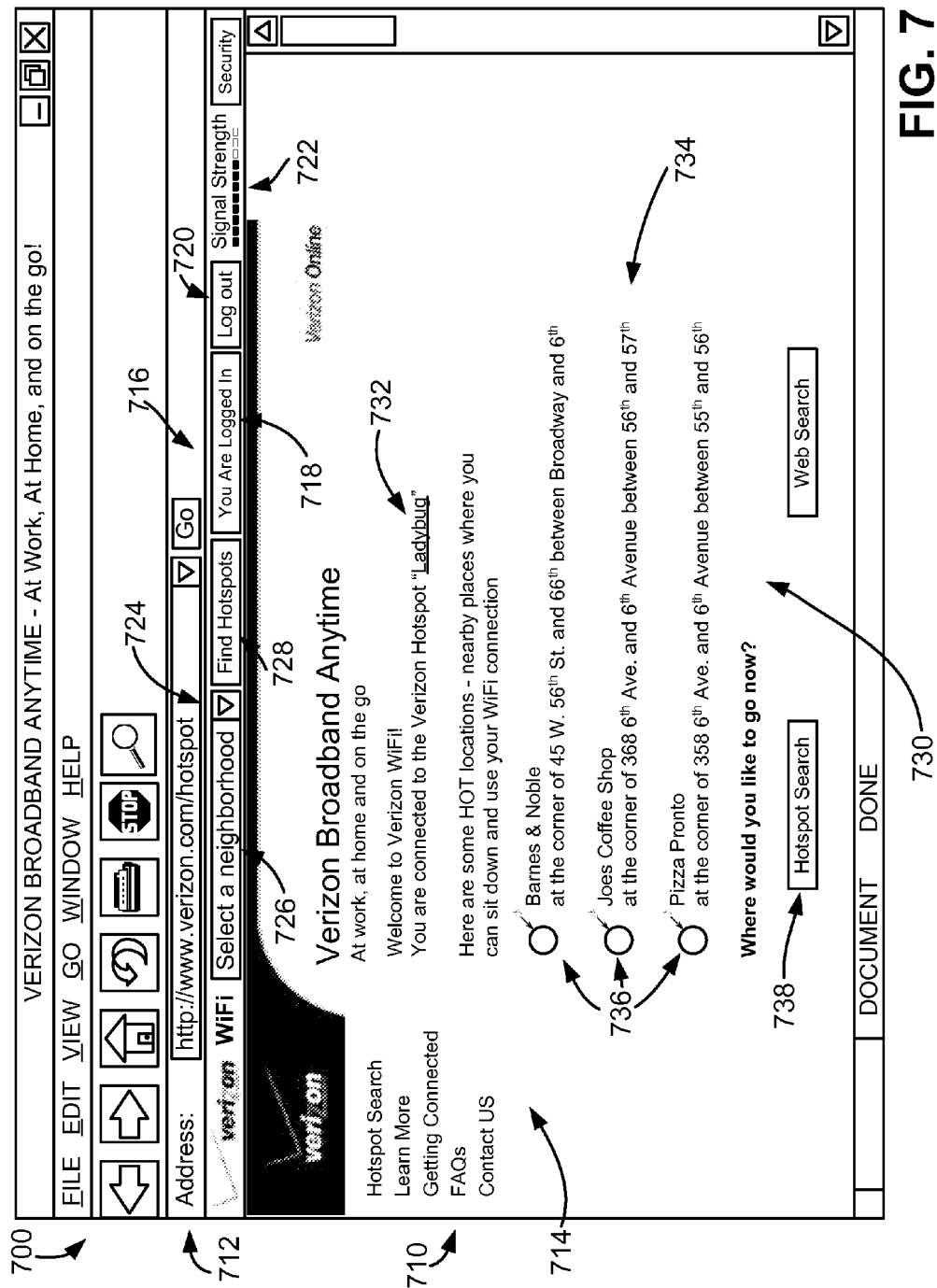
FIG. 7 is an exemplary graphical user interface in an implementation consistent with the principles of the invention.

The following example illustrates the above processing. FIG. 7 is an exemplary graphical user interface 700 in an implementation consistent with the principles of the invention. Graphical user interface 700 may include a network browser 710 including both persistent elements 712 as well as dynamic web content displayed in browser window 714. As is well known in the art, persistent elements 712 of browser 710 remain consistently viewable to the user even while navigating to various different web sites which may modify the content displayed in browser window 714.

In an implementation consistent with the principals of the invention, persistent elements 712 include a wireless network browser toolbar 716 including various elements and options for enhancing and easing the wireless networking experience of the user. More particularly, the wireless network browser toolbar 716 includes several discrete tools, including, but not limited to, a login status indicator 718, a logout option 720, a wireless network signal strength indicator 722, and at least one hotspot selection or location tool 724. As discussed above, login status indicator 718 provides users with persistent notification of their login status. Additionally, the toolbar logout option 720 enables users to easily log out of the wireless network. The wireless network signal strength indicator 722 provides users with an easily viewable graphical representation of their network signal.

Regarding the hotspot selection or location tool 724, in an implementation consistent with the principals of the invention, the tool 724 includes a two step interface for identifying available hotspots. Initially, a user selects one of a number of available neighborhoods from a neighborhood drop down list 726. Once a neighborhood has been selected, the user may click a "Find Hotspots" button 728, which results in a listing of available hotspots in the selected neighborhood being displayed in browser window 714. In one embodiment, the selection of "Find Hotspots" button 728 results in a query being transmitted to a database associated with a web server hosting hotspot location information. In response to the received query, the server retrieves matching location information from the database, and returns the information to the user in the form of a web page.

In addition to wireless network browser toolbar 716, FIG. 7 also includes an exemplary implementation of an initial wireless network login web page 730 shown in browser window 714. Wireless network login web page 730 is preferably displayed upon log in of the user's client device to a wireless network associated with a service provider. Additionally, wireless network login web page 730 may include content specific to the particular hotspot to which the user is currently logged in to. More particularly, an indication of the hotspot currently logged into may be provided at element 732. In one implementation consistent with the principles of the invention, each available hotspot is provided with a unique identifier (e.g., "Ladybug").

In addition to hotspot identification, the wireless network login web page 730 may also provide a section 734 directed toward identifying establishments or locations nearby, which maybe visited or enjoyed while maintaining a wireless network connection to the current hotspot. Mapping icons 736 may be provided for each listed establishment or location. Selection of any of the mapping icons 736 results in the display of a localized map showing the relative location of the selection location. A hotspot search button 738 is also provided for enabling users to find hotspots using a variety of search criteria or techniques described in additional detail below.

Figure 8:
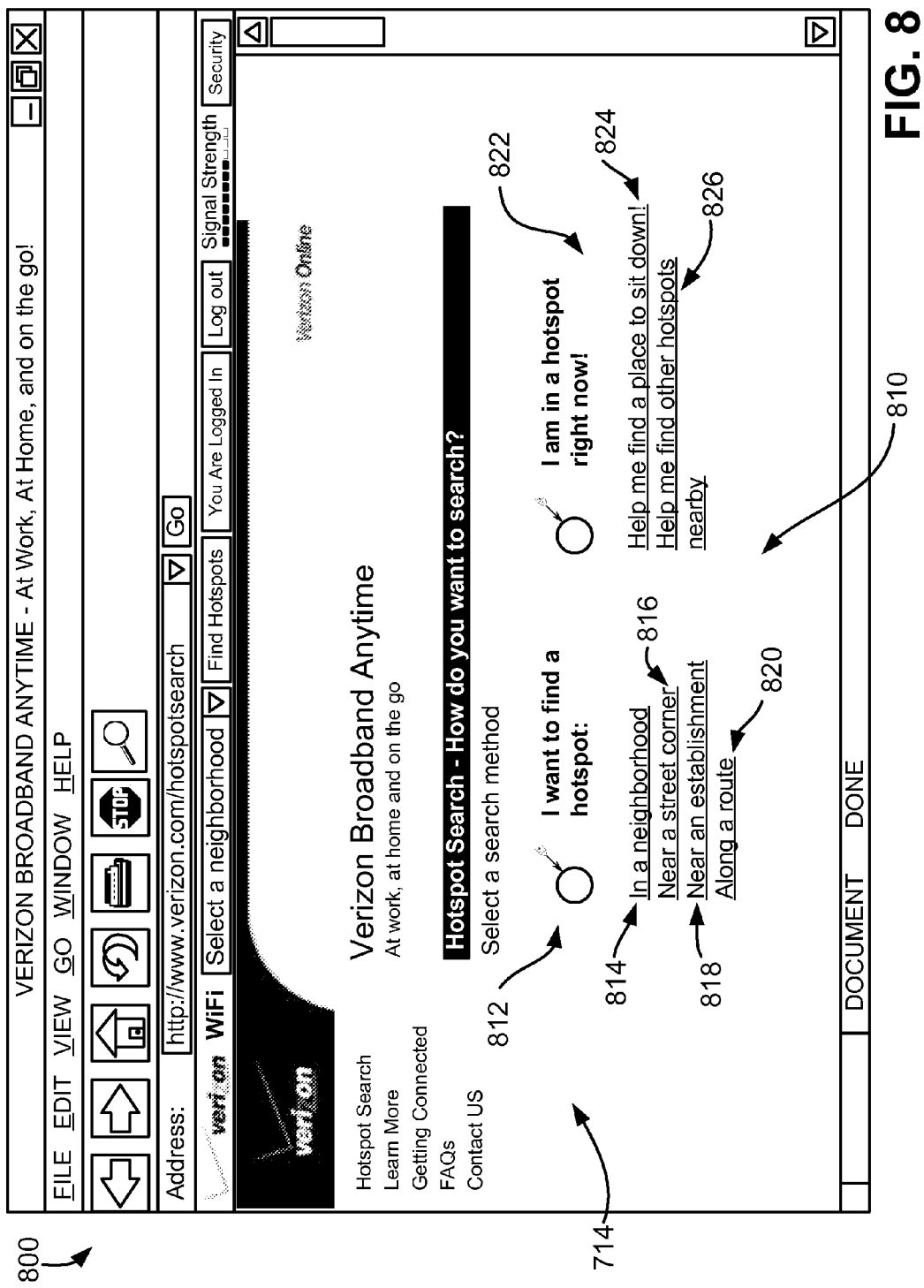
FIG. 8 is another exemplary graphical user interface in an implementation consistent with the principles of the invention.

In FIG. 8, there is shown another exemplary graphical user interface 800 in an implementation consistent with the principles of the invention. Interface 800 includes a browser window 714 displaying an initial hotspot search web page 810 returned upon selection of the hot spot search button 738 described above. More particularly, initial hotspot web page 810 may further include several options relating to the manner in which a hotspot search is conducted. A first grouping of search options 812 relate to hotspot searching when a user is not currently logged into or in the proximity of a desired hotspot. In this instance, users are searching for available hotspots using a variety of search options.

A first search option 814 enables users to search for available hotspots by specific neighborhood. A second search option 816 enables users to search for available hotspots by entering a specific address or intersection. Additional details regarding this search methodology are described below in association with FIG. 9. A third search option 818 enables users to search for available hotspots by entering information regarding a specific establishment or type of establishment (e.g., bookstore, cafe, coffee shop, etc.). Additional details regarding this search methodology are described below in association with FIG. 10. A fourth search option 820 enables users to search for available hotspots by entering travel route information, such as starting and ending points in order to identify available hotspots along the route. Additional details regarding this search methodology are described below in association with FIG. 11.

For those embodiments where the user is not connected to a network, a hotspot database may be stored on client device 140 (e.g., in the memory system), allowing search requests for hotspot locations to be processed. The hotspot database may be updated periodically, for example, at times when client device 140 is connected to a network. Such updates maybe automatically initiated (e.g., by a time alarm or on first login) or manually initiated by the user (e.g., by selecting an update menu selection or web page hyperlink).

A second grouping of hotspot search options 822 displayed on web page 800 relate to hotspot searching when a user is currently logged into or in the proximity of a desired hotspot. In this instance, users are searching for nearby hotspots or establishments within the current hotspot using several search options. A first search option 824 enables users to search for establishments or other locations within the current hotspot.

Additional details regarding this search methodology are described below in association with FIG. 12. A second search option 826 enables users to search for nearby available hotspots in relation to the current hotspot.

Figure 9:
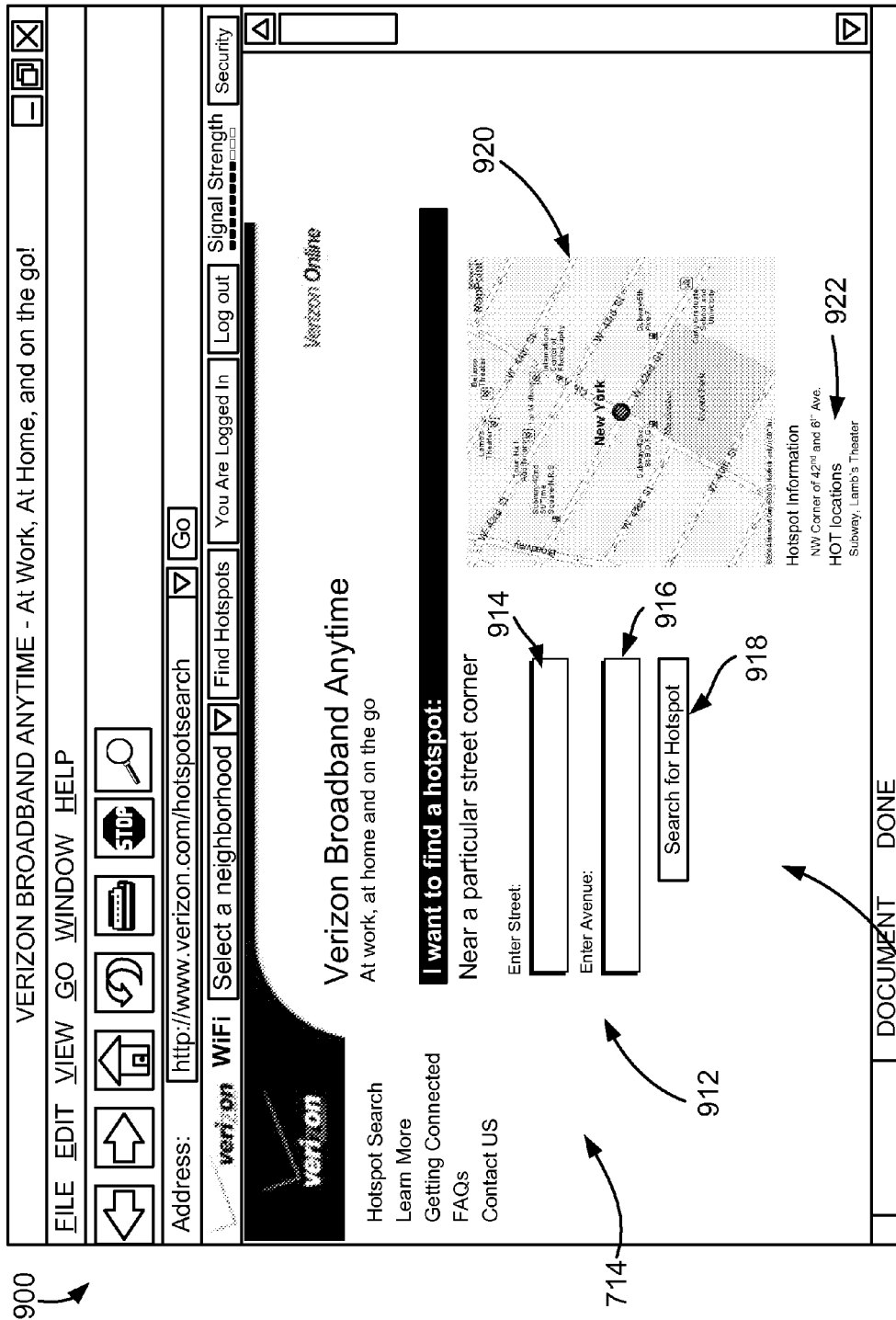
FIG. 9 is yet another exemplary graphical user interface in an implementation consistent with the principles of the invention.

Turning to FIG. 9, there is shown an additional exemplary graphical user interface 900 in an implementation consistent with the principles of the invention. Interface 900 includes a browser window 714 displaying an address/intersection hotspot search web page 910 returned upon selection of the search option 816 described above. More particularly, address/intersection hotspot search web page 910 includes a data entry portion 912 for receiving information from the user regarding the street corner to be searched. In one embodiment, data entry portion 912 includes a first street entry block 914 and a second street entry block 916. Once street corner information has been entered, users click a search for hotspot button 918 to submit the search request.

In response to the search request, a map 920 is updated to reflect the submitted street corner, noting any available hotspots within a predetermined proximity. In addition to map 920, hotspot information 922 may be provided for displaying or listing information regarding any hotspots identified. Additionally, information regarding locations or establishments within the identified hotspots may also be identified and listed.

Figure 10:
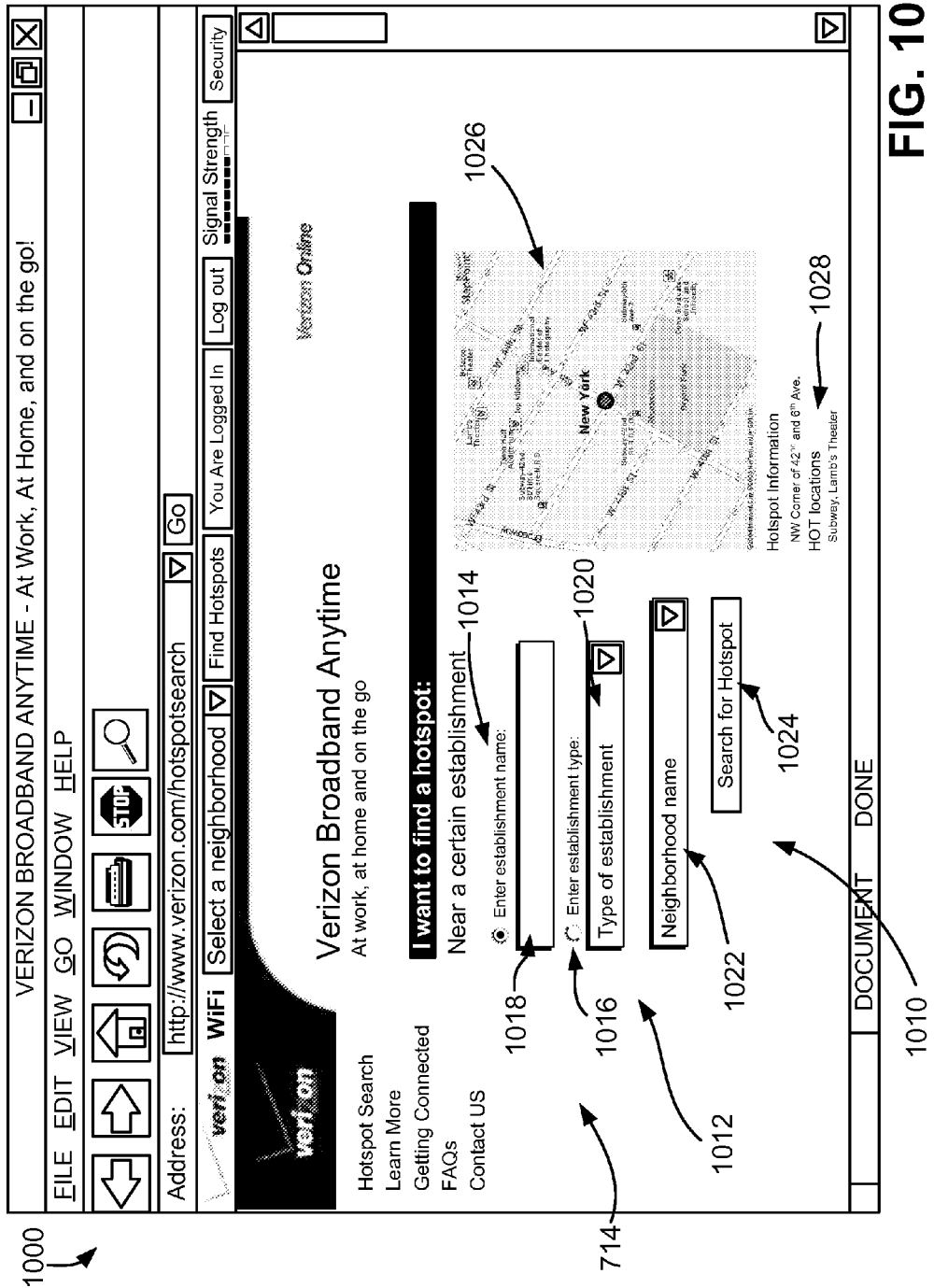
FIG. 10 is still another exemplary graphical user interface in an implementation consistent with the principles of the invention.

In FIG. 10, there is shown another exemplary graphical user interface 1000 in an implementation consistent with the principles of the invention. Interface 1000 includes a browser window 714 displaying a near establishment hotspot search web page 1010 returned upon selection of the search option 818 described above. More particularly, near establishment hotspot search web page 1010 includes a data entry portion 1012 for receiving information from the user regarding the establishment to be searched. In one embodiment, data entry portion 1012 includes user selections relating to searching by establishment name (1014) or establishment type (1016). Even more particularly, the selection of the manner of establishment searching may be enabled by radio button selection or any suitable alternative manner. For establishment name selection, a data entry block 1018 is provided for receiving a user-entered establishment name. For establishment type selection, a drop down listing 1020 of available establishment types is provided for users to select.

Prior to completing the search request, users can further narrow down the geographic area in which to perform the establishment search by selecting a specific neighborhood from a neighborhood name drop down list 1022. Once establishment name/type and neighborhood information has been entered, users click a search for hotspot button 1024 to submit the search request. In response to the search request, a map 1026 is updated to reflect the submitted neighborhood, noting any available hotspots within a predetermined proximity as well as establishments matching the user submitted name or type within the available hotspots. In addition to map 1026, hotspot information 1028 may be provided for displaying or listing information regarding any hotspots or establishments identified.

Figure 11:
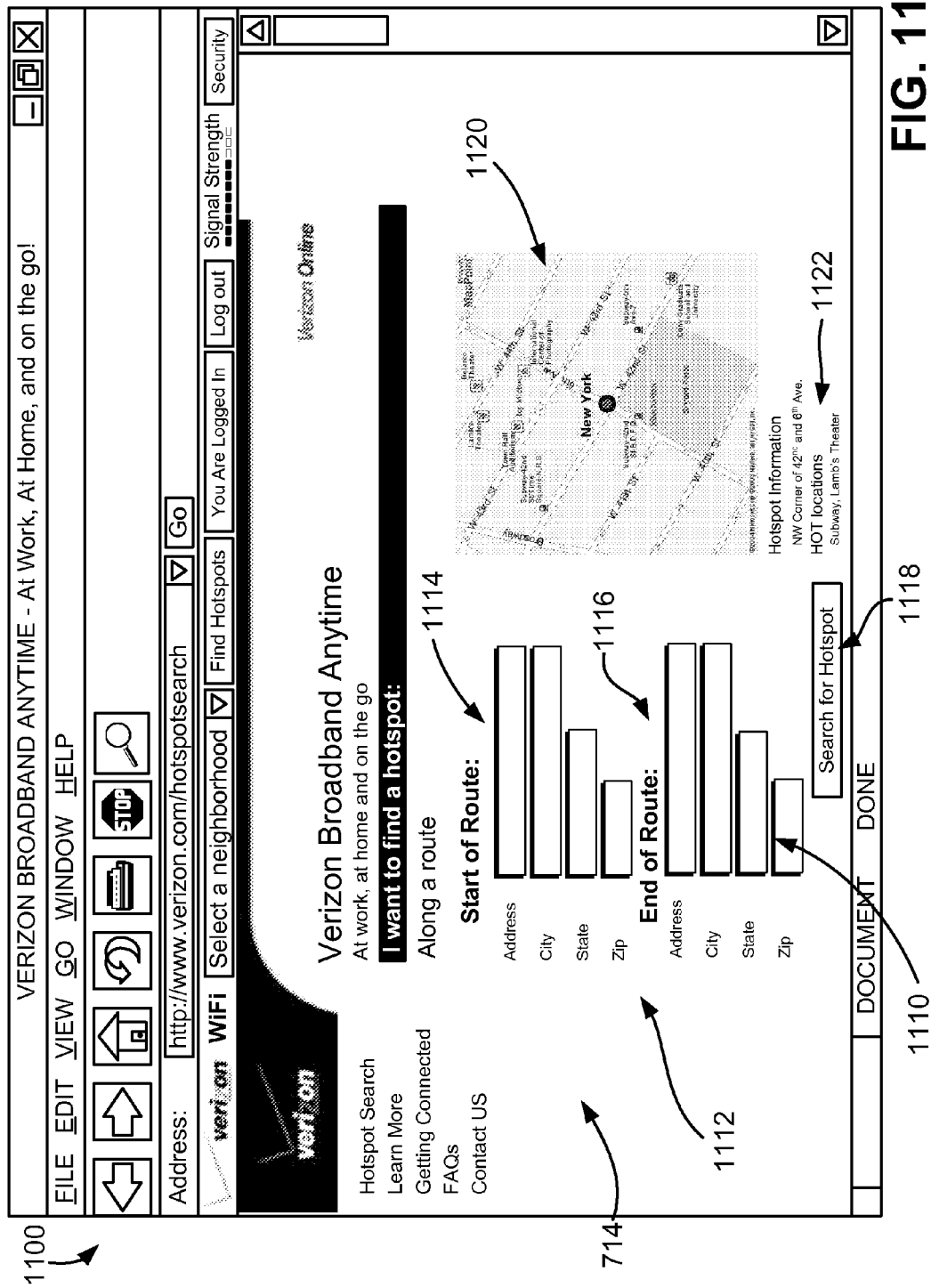
FIG. 11 is another exemplary graphical user interface in an implementation consistent with the principles of the invention.

Turning to FIG. 11, there is shown another exemplary graphical user interface 1100 in an implementation consistent with the principles of the invention. Interface 1100 includes a browser window 714 displaying an along a route hotspot search web page 1110 returned upon selection of the search option 820 described above. More particularly, along a route hotspot search web page 1110 includes a data entry portion 1112 for receiving information from the user regarding the route along which hotspots are to be searched. In one embodiment, data entry portion 1112 includes data entry blocks for receiving starting address information (1114) and ending address information (1116).

Once route information has been entered, users click a search for hotspot button 1118 to submit the search request. In response to the search request, a map 1120 is updated to reflect the submitted route, noting any available hotspots within a predetermined proximity to the route as well as establishments or locations within the identified hotspots. In addition to map 1120, hotspot information 1122 may be provided for displaying or listing information regarding any hotspots or establishments identified.

Figure 12:
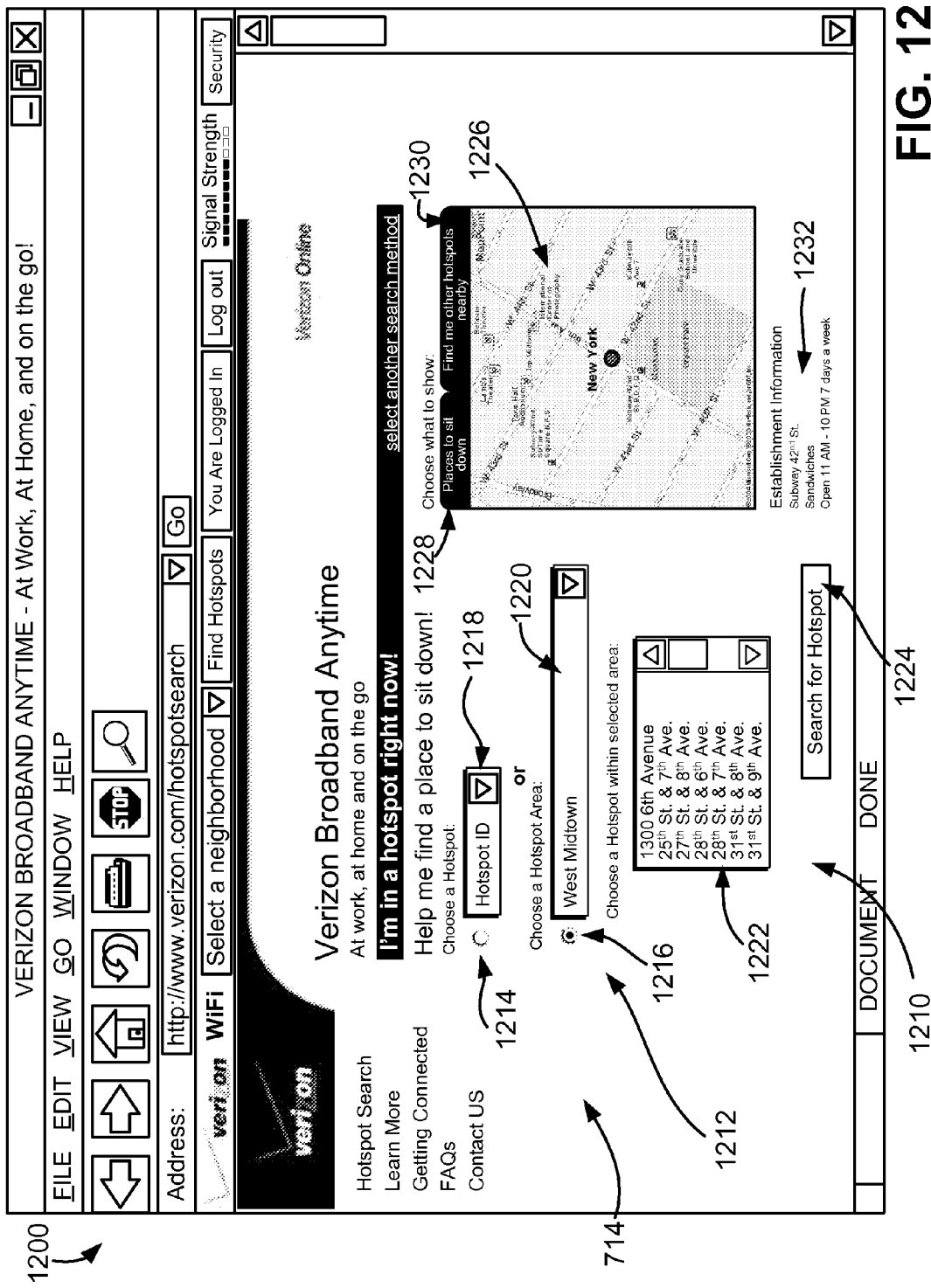
FIG. 12 is yet another exemplary graphical user interface in an implementation consistent with the principles of the invention.

Turning to FIG. 12, there is shown another exemplary graphical user interface 1200 in an implementation consistent with the principles of the invention. Interface 1200 includes a browser window 714 displaying a "Help me find a place to sit down" web page 1210 returned upon selection of the search option 824 described above. More particularly, the "Help me find a place to sit down" web page 1210 includes a data entry portion 1212 for receiving information from the user regarding the hotspot within which they would like to search. In one embodiment, data entry portion 1212 includes user selections relating to searching by hotspot id (1214) or neighborhood/location (1216). Even more particularly, the selection of the manner of searching may be enabled by radio button selection or any suitable alternative manner. For hotspot id selection, a drop down listing 1218 is provided for receiving a user selection of an available unique hotspot identity (e.g., ladybug, etc.). For neighborhood/location selection, an initial drop down listing 1220 of available neighborhoods is provided for users to select. Once a neighborhood has been selected from list 1220, a second listing 1222, including all available hotspots within the selected neighborhood, is provided.

Once hotspot or neighborhood/location has been entered, users click a search for hotspot button 1224 to submit the search request. In response to the search request, a map 1226 is updated to reflect the submitted neighborhood, noting either any nearby hotspots within a predetermined proximity or any establishments within the selected hotspot. Selection of which information to display is made via buttons 1228 and 1230. In addition to map 1226, hotspot information 1232 may be provided for displaying or listing information regarding any hotspots or establishments identified.

Implementations consistent with the principles of the invention provide wireless network users with easy-to-use resources relating to network status, signal and hotspot locations. In this manner, users are more likely to be satisfied with their network experience.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, one or more of the acts described with respect to FIG. 6 may be performed by client device 140 or another device (or combination of devices) in system 100. In one implementation, one or more of the acts described with respect to FIG. 6 may be performed by a client 140 or a server, such as one of servers 150. Additionally, although the user interface described herein references a persistent wireless network browser toolbar, other forms of graphical user interfaces maybe used without departing from the spirit or scope of the present invention, including, but not limited to, persistent pop-up windows or drop down menus.

Moreover, while a series of acts has been described with regard to FIG. 6, the order of the acts may be varied in other implementations consistent with the present invention. Moreover, non-dependent acts may be implemented in parallel.

It will also be apparent to one of ordinary skill in the art that the various possible embodiments of the invention, including the preferred embodiments described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the preferred embodiments of the invention were described without reference to the specific software code—it being understood that one of ordinary skill in the art would be able to design software and control hardware to implement the aspects based on the description herein.

Further, certain embodiments according to the present invention may be implemented (either all or in part) as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items.

The invention claimed is:

1. A method comprising:
    detecting, by a first device, whether a second device is connected to a wireless hotspot, the second device being different from the first device;
    providing, by the first device and to the second device, information associated with the wireless hotspot,
        the information being provided to the second device when the second device is connected to the wireless hotspot,
        the information including information identifying a plurality of locations, and
        the information including a plurality of options to perform a search for one or more locations, of the plurality of locations, associated with the wireless hotspot;
    receiving, by the first device, information regarding a selection of one of the plurality of locations;
    determining, by the first device, one or more available wireless hotspots,
        the one or more available wireless hotspots being associated with the selected one of the plurality of locations, and
        the plurality of locations being accessible by the second device while the second device is connected to the wireless hotspot;
    providing, by the first device and for display by the second device, a list of the one or more available wireless hotspots;
    detecting, by the first device, a selection of a particular option of the plurality of options;
    providing, by the first device and based on the detected selection, information identifying a plurality of types of establishments;
    detecting, by the first device, a selection of a particular type of establishment of the plurality of types of establishments; and
    providing, by the first device and based on the detected selection of the particular type of establishment, information identifying one or more locations within a particular distance of the selected particular type of establishment.

2. The method of claim 1, where the plurality of locations include a current location of the second device,
where providing the information associated with the wireless hotspot further includes:
monitoring a signal strength, associated with the second device, at the current location; and
providing information identifying the monitored signal strength.

3. The method of claim 1, further comprising:
causing a map to be provided based on the received information,
where the map identifies the selected one of the plurality of locations.

4. The method of claim 1, where providing the information, associated with the wireless hotspot, includes:
providing information indicating that the second device is connected to the wireless hotspot, and
providing information identifying a signal strength associated with the second device at one of the plurality of locations.

5. The method of claim 1, where providing the information associated with the wireless hotspot includes:
causing the information associated with the wireless hotspot to be provided via a screenshot,
where the information, associated with the wireless hotspot and provided via the screenshot, includes an option to perform a search for geographical areas associated with the wireless hotspot.

6. The method of claim 5, further comprising:
detecting selection of the option to perform the search for the geographical areas associated with the wireless hotspot; and
causing a plurality of options, for performing the search for the geographical areas associated with the wireless hotspot, to be provided via another screenshot,
where each of the plurality of options is associated with a different type of search for the geographical areas associated with the wireless hotspot.

7. The method of claim 1, where the plurality of options further include at least one of:
a first option to perform the search for the geographical areas based on an identifier of a particular geographical area,
a second option to perform the search for the geographical areas based on the particular type of establishment, or
a third option to perform the search for the geographical areas based on information identifying a route, and
where the method further comprises at least one of:
causing the search for the geographical areas to be performed based on the identifier of the particular geographical area when selection of the first option is detected;
causing the search for the geographical areas to be performed based on the particular type of the establishment when selection of the second option is detected; or
causing the search for the geographical areas to be performed based on the information identifying the route when selection of the third option is detected.

8. A system comprising:
a memory to store instructions; and
a processor to execute the instructions to:
detect that a device is connected to a wireless hotspot,
provide, to the device, information associated with the wireless hotspot,
the information being provided to the device via the wireless hotspot,
the information including information identifying a plurality of locations, and
the information including a plurality of options to perform a search for one or more locations, of the plurality of locations, associated with the wireless hotspot,
receive information regarding a selection of one of the plurality of locations,
determine one or more available wireless hotspots,
the one or more available wireless hotspots being associated with the selected one of the plurality of locations, and
the plurality of locations being accessible by the device while the device is connected to the wireless hotspot,
provide, to the device and for display, a list of the one or more available wireless hotspots,
detect selection of a particular option of the plurality of options,
provide, based on the detected selection, information identifying a plurality of types of establishments,
detect a selection of a particular type of establishment of the plurality of types of establishments, and
provide, based on the detected selection of the particular type of establishment, information identifying one or more locations within a particular distance of the selected particular type of establishment.

9. The system of claim 8, where the information, associated with the wireless hotspot, includes an option to perform a search for geographical areas associated with the wireless hotspot, and
where the processor is further to:
detect selection of the option to perform the search for the geographical areas associated with the wireless hotspot, and
cause a plurality of options, to perform the search for the geographical areas associated with the wireless hotspot, to be provided to the device.

10. The system of claim 8, where the plurality of options further include at least one of:
an option to perform the search for the geographical areas based on a particular proximity to a particular establishment,
an option to perform the search for the locations based on a particular proximity to a particular address, or
an option to perform the search for the locations based on information identifying a particular route.

11. The system of claim 9, where the processor is further to:
cause a map to be provided based on the detected selection,
where the map identifies one or more locations within the geographical area associated with the particular identifier, the one or more locations within the geographical area associated with the particular identifier being associated with the wireless hotspot.

12. The system of claim 8, where the information, associated with the wireless hotspot and including the option to perform the search for the locations associated with the wireless hotspot, is provided via a first web document, and
where the plurality of options are provided via a second web document that is different than the first web document.

13. The system of claim 8, where, when providing the information associated with the wireless hotspot, the processor is further to provide at least one of:
- information identifying a signal strength associated with the device at one of the plurality of locations, or
- information indicating that the device is connected to the wireless hotspot.

14. One or more non-transitory computer-readable memory devices including instructions, the instructions comprising:
- one or more instructions which, when executed by at least one processor, cause the at least one processor to detect that a device is connected to a wireless hotspot;
- one or more instructions which, when executed by the at least one processor, cause the at least one processor to provide, to the device, information associated with the wireless hotspot when the device is connected to the wireless hotspot,
  - the information including information identifying a plurality of geographical areas, and
  - the information including a plurality of options to perform a search for one or more geographical areas, of the plurality of geographical areas, associated with the wireless hotspot;
- one or more instructions which, when executed by the at least one processor, cause the at least one processor to receive other information regarding a selection of one of the plurality of geographical areas;
- one or more instructions which, when executed by the at least one processor, cause the at least one processor to determine one or more available wireless hotspots,
  - the one or more available wireless hotspots being associated with the selected one of the plurality of geographical areas, and
  - the plurality of geographical areas being accessible by the device while the device is connected to the wireless hotspot;
- one or more instructions which, when executed by the at least one processor, cause the at least one processor to provide, for display by the device, a list of the one or more available wireless hotspots;
- one or more instructions which, when executed by the at least one processor, cause the at least one processor to detect selection of a particular option of the plurality of options;
- one or more instructions which, when executed by the at least one processor, cause the at least one processor to provide, based on the detected selection, information identifying plurality of types of establishments;
- one or more instructions which, when executed by the at least one processor, cause the at least one processor to detect a selection of a particular type of establishment of the plurality of types of establishments; and
- one or more instructions which, when executed by the at least one processor, cause the at least one processor to provide, based on the detected selection of the particular type of establishment, information identifying one or more locations within a particular distance of the selected particular type of establishment.

15. The one or more non-transitory computer-readable memory devices of claim 14, where the plurality of geographical areas include a first geographical area and the one or more instructions to provide the information associated with the wireless hotspot include:
- one or more instructions to monitor a signal strength, associated with the device, at the first geographical area; and
- one or more instructions to provide information identifying the monitored signal strength.

16. The one or more non-transitory computer-readable memory devices of claim 14, where the information identifies a first geographical area, of the plurality of geographical areas, and the information includes:
- information uniquely identifying the first geographical area, and
- information identifying a plurality of locations within the first geographical area.

17. The one or more non-transitory computer-readable memory devices of claim 16, where the first geographical area is associated with a current location of the device,
- where the plurality of locations include locations within a particular distance of the current location, and
- where the device remains connected to the wireless hotspot when the device is moved from the current location to one of the plurality of locations.

18. The one or more non-transitory computer-readable memory devices of claim 14, where the instructions further comprise:
- one or more instructions to detect selection of another particular option of the plurality of options,
- one or more instructions to cause, based on the selection of the other particular option, a plurality of identifiers to be provided,
  - each of the plurality of identifiers being associated with a corresponding one of the geographical areas,
- one or more instructions to detect selection of a particular identifier of the plurality of identifiers, and
- one or more instructions to provide, based on the detected selection of the particular identifier, information identifying one or more locations, within the geographical area associated with the particular identifier, that are associated with the wireless hotspot.

19. The one or more non-transitory computer-readable memory devices of claim 14, and where the plurality of options further include at least one of:
- an option to perform the search for the geographical areas based on an identifier of a particular geographical area,
- an option to perform the search for the geographical areas based on a type of a location, or
- an option to perform the search for the geographical areas based on information identifying a route.

20. The one or more non-transitory computer-readable memory devices of claim 14, where the one or more instructions to provide the information associated with the wireless hotspot include:
- one or more instructions to provide information indicating that the device is connected to the wireless hotspot.

* * * * *